United States Patent
Baumert et al.

(10) Patent No.: US 6,588,522 B2
(45) Date of Patent: Jul. 8, 2003

(54) VEHICLE WITH A FUEL CELL SYSTEM AND METHOD FOR OPERATING THE SAME

(75) Inventors: Rob Baumert, San Diego, CA (US); Craig Greenhill, Richmond (CA)

(73) Assignee: Ballard Power System AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/922,915

(22) Filed: Aug. 7, 2001

(65) Prior Publication Data

US 2003/0029649 A1 Feb. 13, 2003

(51) Int. Cl.$^7$ ................................................. B60K 1/00
(52) U.S. Cl. ..................... 180/65.1; 62/238.6; 429/26
(58) Field of Search ........................... 180/65.1, 65.2, 180/65.3, 65.4, 53.1, 53.5, 53.8; 62/238.6, 239, 323.1, 259.2; 429/26

(56) References Cited

U.S. PATENT DOCUMENTS

| | | | | |
|---|---|---|---|---|
| 5,537,956 A | * | 7/1996 | Rennfeld et al. | 123/41.29 |
| 6,232,006 B1 | * | 5/2001 | Breault | 429/26 |
| 6,380,835 B1 | * | 4/2002 | Lee | 336/200 |
| 6,448,535 B1 | * | 9/2002 | Ap | 180/65.1 X |

FOREIGN PATENT DOCUMENTS

JP 4-337251 * 11/1992

OTHER PUBLICATIONS

U.S. patent application Publication 2002/0184908—dated Dec. 12, 2002.*
2001/0018832—patent application Publication dated Sep. 6, 2001.*
2001/0028972—patent application Publication dated Oct. 11, 2001.*
2001/0046618—patent application Publication dated Nov. 29, 2001.*
2001/0050191—patent application Publication dated Dec. 13, 2001.*
2002/0031693—patent application Publication dated Mar. 14, 2002.*
2002/0040896—patent application Publication dated Apr. 11, 2002.*
2002/0053216—patent application Publication dated May 9, 2002.*

* cited by examiner

Primary Examiner—Brian L. Johnson
Assistant Examiner—Bryan Fischmann
(74) Attorney, Agent, or Firm—Crowell & Moring LLP

(57) ABSTRACT

A vehicle includes a traction unit for delivering mechanical power from a combustion engine to a vehicle drive shaft and driving wheels, electric loads and a vehicle cooling loop for cooling vehicle components and/or said combustion engine. A fuel cell system, which supplies the electric loads with electric power, includes a fuel cell stack, an anode fuel input, a anode exhaust, a cathode fuel input, a cathode exhaust, and a fuel cell cooling loop for cooling the fuel cell stack via an input line which delivers a cooling medium into the fuel cell stack and an output line which removes the heated cooling medium from the fuel cell stack. A compression/expansion unit is provided between the output line of the fuel cell stack and the vehicle cooling loop. The expansion side of the compression/expansion unit in thermal contact with the heated cooling medium, which is at a first temperature level, so that heat is transferred from the heated cooling medium to the expansion side of the compression/expansion unit. The vehicle cooling loop is in thermal contact with the compression side of the compression/expansion unit for transferring the heat thus delivered into the vehicle cooling loop at a second temperature level.

10 Claims, 1 Drawing Sheet

VEHICLE WITH A FUEL CELL SYSTEM AND METHOD FOR OPERATING THE SAME

BACKGROUND AND SUMMARY OF THE INVENTION

The invention relates to a vehicle with a fuel cell system and a method for operating such a vehicle.

U.S. Pat. No. 5,537,956 discloses a coolant system for use in a fuel cell vehicle. A first coolant circuit includes a component such as a fuel cell to be cooled, a radiator with a cooling fan and a coolant pump for circulating coolant through the first component and the radiator. A by-pass line arranged in parallel flow relationship with the radiator includes a second heat exchanger, with a fan for providing heated air for the passenger compartment of the vehicle, and a control valve which controls the coolant flow through the by-pass line and the second heat exchanger. A second coolant circuit provided which also passes through the second heat exchanger, separately from the first coolant circuit and includes an additional component to be cooled.

One object of the invention is to provide an arrangement for cooling vehicle components that operate at different coolant temperature levels.

This and other objects and advantages are achieved by the method and apparatus according to the invention, in which a vehicle having a fuel cell system is provided with a first cooling circuit for cooling the fuel cell, and a second cooling circuit for cooling vehicle components, including a propulsion engine. A compression/expansion unit is provided between the first and second cooling circuits, with the cold (expansion) side of the compression/expansion unit being in thermal contact with the heated cooling medium of the first cooling circuit which is at a first, relatively cooler temperature, and the hot (compression) side in thermal contact with the second cooling circuit, which is at a second, relatively warmer temperature, so that heat is transferred from the former to the latter.

The invention allows the fuel cell system to be cooled by the vehicle cooling loop, although the temperature difference between the fuel cell cooling loop and the vehicle cooling loop is small.

Other objects, advantages and novel features of the present invention will become apparent from the following detailed description of the invention when considered in conjunction with the accompanying drawings.

DETAILED DESCRIPTION OF THE INVENTION

Figure 1:
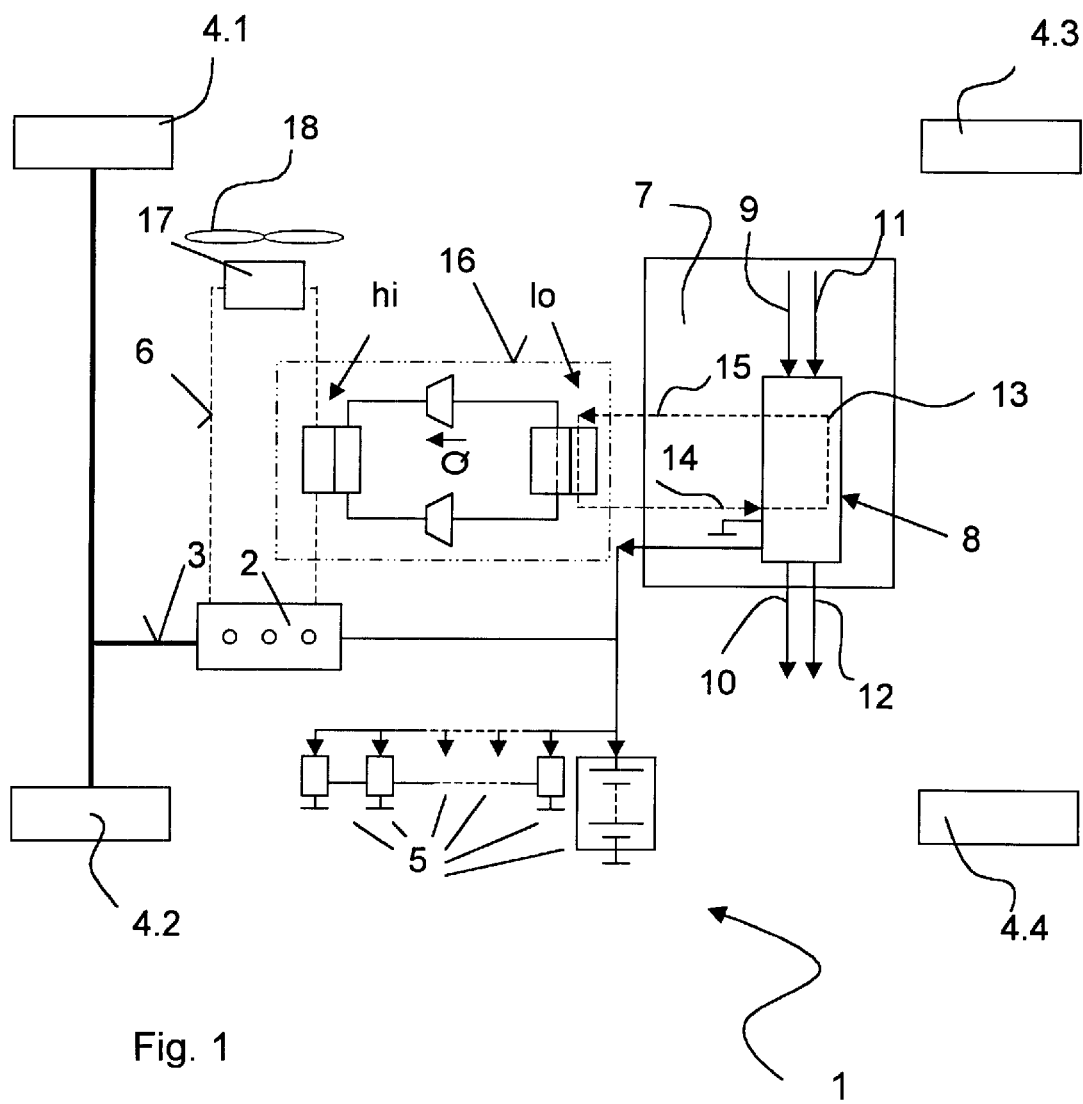
FIG. 1 shows a schematic sketch of a first preferred embodiment of a vehicle with a combustion engine and a fuel cell system according to the invention.

The invention can be advantageously used in motor vehicles where a fuel cell system supplies electric power for low power requirements. The invention can also be used very advantageously in trucks with high power engines, which usually idle for extended periods of time to meet their low power requirements.

As illustrated schematically in FIG. 1, a vehicle according to the invention comprises four wheels 4.1, 4.2, 4.3, 4.4 and a traction unit 2 which delivers mechanical power for driving at least one wheel drive shaft 3 with driving wheels 4.1, 4.2. The vehicle also comprises electric loads 5, which may include an electric storage medium such as a battery. The traction unit 2 is preferably a combustion engine, which can power the electrical loads 5 when the engine is running.

A vehicle cooling loop 6, indicated by a dashed line in the figure, is used in the usual manner to cool vehicle components (electric loads 5 and/or the traction unit engine 2) via a radiator 17 and a fan 18 that cools the radiator 17. The cooling fan 18 may be run by an electric motor (not shown) which is also a member of the electric vehicle loads 5.

The vehicle 1 also has a fuel cell system 7 which supplies electric power to the electric loads 5, preferably used in the form of auxiliary power unit (APU). The APU is a compact unit capable of delivering moderate electric power which is much lower than the electric power provided by a fuel cell system for traction applications. It is cheaper and weighs less than a fuel cell system for traction purposes.

The fuel cell system 7, which is not shown in detail, may include a reforming system for producing a hydrogen rich reformate stream and a gas cleaning system as well as a thermal management system, as is well known to persons skilled in the art of fuel cell systems. The fuel cell system 7 may be run on a fuel selected from the group of alcohols, ethers, carbon hydrates, hydrogen or other fuels suitable as fuel for fuel cells.

The fuel cell system 7 includes a fuel cell stack 8, with an anode fuel input 9, an anode exhaust 10, a cathode fuel input 11 and a cathode exhaust 12. The anode fuel (preferably hydrogen) is supplied via an anode input 9 and the anode exhaust is removed from the fuel cell stack 8 via the exhaust line 10. The cathode fuel, preferably air, is supplied to the cathode via a cathode input 11 and the cathode exhaust is removed from the stack via exhaust line 12.

The fuel cell stack 8 consists of a multiplicity of individual fuel cells stacked together to form a single unit, so that the fuel cell stack 8 is capable of delivering enough electrical power to power the auxiliary electrical loads in the vehicle 1.

The fuel cell stack 8 is cooled by a fuel cell cooling loop 13, indicated by a dashed line 13 in the figure, which includes an input line 14 for delivering a cooling medium into the fuel cell stack 8 and an output line 15 for removing the heated cooling medium from the fuel cell stack 8.

If the fuel cell stack 8 consists of PEM fuel cells which are equipped with a polymer electrolyte membrane, the processing temperature of the fuel cell stack 8 is relatively low. A typical temperature is between 70° C. and 80° C. For APU systems in a vehicle a key problem is that the heat produced by the fuel cell stack 8 is at a temperature lower than the standard temperature of the vehicle cooling loop 6. Therefore, potential synergies between the stack cooling loop 13 and the vehicle cooling loop 6 cannot be achieved, and two completely separate cooling loops are required.

According to the invention the heat produced by the fuel cell stack 8, which is removed by heating the cooling medium of the fuel cell cooling loop 13, is delivered to the expansion side of a compression/expansion unit 16. The compression/expansion unit 16 performs compression/expansion cycles with a refrigerant and exhibits a cold side at its expansion side and a hot side at its compression side. In the figure the compression/expansion unit 16 is indicated by a loop with a heat exchanger at the low temperature side (lo), a heat exchanger at the high temperature side (hi), a compressor in one branch between the two heat exchangers and an expander in the other branch of the loop. This symbolizes the effect that the cold side of the compression/ expansion unit 16 draws heat and the hot side delivers heat. According to the invention the compression/expansion unit 16 is employed between the cooling loop 13 of the fuel cell stack 8 and the vehicle cooling loop 6.

The cold expansion side of the compression/expansion unit 16 is in thermal contact with the heated cooling medium of the fuel cell cooling loop 13, which is cooled by thermal conduction by the cold expansion side of the compression/expansion unit 16. The vehicle cooling loop 6 is in thermal contact with the hot compression side of the compression/expansion unit 16 and heated by the hot compression side of the compression/expansion unit 16.

The cooling medium of the fuel cell stack 8 leaves the stack at a first low temperature level lo, e.g. 70° C.–80° C., and is cooled by the cold expansion side of the compression/expansion unit 16. In this manner, the heat of the stack cooling medium is transferred to the compression side of the compression/expansion unit 16 and is transferred via its hot side to the vehicle cooling loop 6 at a second temperature level hi which is higher than the first temperature level. This heat transfer from lo to hi is indicated in the figure by symbol Q in the compression/expansion unit 16. Thus, according to the invention, the heat of the fuel cell cooling loop output is transferred into the vehicle cooling loop 6 at a higher temperature level hi than the output temperature lo of the fuel cell stack 8.

Advantageously the compression/expansion unit 16 is a commercially available air conditioning unit commonly employed in domestic applications. Such units are compact, cheap and reliable. Usually such units need no more than 5 kW electric power. The volume to electric power ratio of such an air conditioning unit suffices to cool a fuel cell stack 8 which is equipped in size and power as an APU unit. The cooling power requirements of the APU fuel cell system 7 and the cooling power generated by the compression/expansion unit 16 match well in this arrangement.

Preferably, the coolants used in the cooling loops of vehicle and fuel cell stack 6, 13 are liquids, especially water or water based cooling liquids. The compression/expansion unit 16 can be electrically connected to and powered by the fuel cell system 7.

In one embodiment, the cooling medium of the fuel cell cooling loop 13 is cooled down by about 10° C. from a typical temperature of 80° C. to 70° C. by heat exchange with the cold expansion side of the compression/expansion unit 16 whereas the refrigerant medium is heated by about 10° C. from e.g. 50° C. to 60° C. By compression of the refrigerant in the compression/expansion unit 16 the refrigerant is heated to a temperature much higher than the temperature of the fuel cell cooling loop, up to e.g. 130° C. At this high temperature, the hot compression side of the compression/expansion unit 16 is in heat exchange with the vehicle cooling loop 6. The vehicle cooling loop 6 is cooled via the radiator 17 and the fan 18. Even if the ambient temperature is about 45° C. the radiator cools the cooling medium down to e.g., 80° C. By expansion in the expansion/compression unit 16 the refrigerant can be cooled down from 80° C. to 50° C.

By taking advantage of the energy lever performed by the compression/expansion unit 16 this process can utilize the vehicle cooling loop 6 to cool the fuel cell stack 8 and/or also the fuel cell system 7 very effectively without significant increase in energy costs and requirements, or significant increase in component volume or weight. The use of a commercial air conditioning unit as an expansion/compression unit 16 is highly advantageous for the APU-fuel-cell system 7 as the air conditioning system does not scale. Typically, for air conditioning the load is rather low and the ratio of electric power to cooling power is about 1:3. For example 1 kW electric power is necessary to remove 3 kW of heat, but for higher loads the ratio is unfavorable.

Because of the relatively low quantities of energy involved, and the use of liquids for heat exchange, the required hardware is of low volume and weight, requiring only the compressor for the refrigerant liquid, the already existent pumps for the vehicle and the fuel cell cooling loops 6, 13, and a single fan 18 for the vehicle cooling loop 6. This also allows the fuel cell stack 8 to exhaust its heat at an elevated ambient temperature, which is extremely important for operation of the vehicle in high temperature environments in summer time or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a traction unit for delivering mechanical power from a combustion engine to drive vehicle wheels; electric loads; a vehicle cooling loop for cooling at least one of vehicle components and said combustion engine; a fuel cell system for supplying said electric loads with electric power, said fuel cell system including a fuel cell stack, an anode fuel input, an anode exhaust, a cathode fuel input and a cathode exhaust; and a fuel cell cooling loop for cooling the fuel cell stack including an input line for delivering a cooling medium into the fuel cell stack and an output line for removing the heated cooling medium from the fuel cell stack, wherein:

a compression/expansion unit is provided between the fuel cell cooling loop and the vehicle cooling loop;

a cold expansion side of the compression/expansion unit is in thermal contact with heated cooling medium, which is at a first, relatively lower, temperature level, whereby heat of the heated cooling medium is transferred to a hot compression side of said compression/expansion cycle unit; and the vehicle cooling loop is in thermal contact with the compression side of said compression/expansion unit, for transferring said heat into the vehicle cooling loop at a second, relatively higher, temperature level.

2. The vehicle according to claim 1, wherein the compression/expansion unit is an air conditioning unit with no more than 5 kW electric power requirements.

3. The vehicle according to claim 1, wherein the compression/expansion unit is electrically connected to the fuel cell system.

4. The vehicle according to claim 1, wherein the fuel cell system is an auxiliary power unit.

5. The vehicle according to claim 1, wherein the traction unit is a combustion engine.

6. The vehicle according to claim 1, wherein the fuel cell stack is a low temperature PEM fuel cell stack.

7. A method for operating a vehicle having a traction unit for delivering mechanical power from a combustion engine to drive vehicle wheels; electric loads; a vehicle cooling loop for cooling at least one of vehicle components and said combustion engine; a fuel cell system for supplying said electric loads with electric power, said fuel cell system including a fuel cell stack, an anode fuel input, an anode exhaust, a cathode fuel input and a cathode exhaust; and a fuel cell cooling loop for cooling the fuel cell stack including an input line for delivering a cooling medium into the fuel cell stack and an output line for removing the heated cooling medium from the fuel cell stack, wherein a compression/expansion unit is provided between the fuel cell cooling loop and the vehicle cooling loop; a cold expansion side of the compression/expansion unit is in thermal contact with heated cooling medium, which is at a first, relatively lower, temperature level; and the vehicle cooling loop is in thermal contact with the compression side of said compression/expansion unit; said method comprising:

transferring the heat of the heated cooling medium to the expansion side of the compression/expansion unit at a first temperature level;

transferring said heat to the compression side of the compression/expansion unit; and transferring said heat to the vehicle cooling loop at the second temperature level which is higher than the first temperature level.

8. A vehicle comprising:

a traction unit for propelling the vehicle;

a fuel cell system for providing electric power to electric loads of said vehicle;

a first cooling circuit for cooling said fuel cell by circulating a first cooling medium therethrough;

a second cooling circuit for cooling at least said traction unit by circulating a second cooling medium therethrough; and a compression/expansion unit connected between said first cooling circuit and said second cooling circuit; wherein a cold expansion side of the compression/expansion unit is in thermal contact with heated cooling medium of the first cooling circuit flowing out of said fuel cell; and a hot expansion side of the compression/expansion unit is in thermal contact with cooling medium of said second cooling circuit.

9. A cooling system for a vehicle having a traction unit for propelling the vehicle and a fuel cell system for providing electric power to electric loads of the vehicle, said cooling system comprising:

a first cooling circuit for cooling said fuel cell by circulating a first cooling medium therethrough;

a second cooling circuit for cooling at least said traction unit by circulating a second cooling medium therethrough; and a compression/expansion unit connected between said first cooling circuit and said second cooling circuit; wherein a cold expansion side of the compression/expansion unit is in thermal contact with heated cooling medium of the first cooling circuit flowing out of said fuel cell; and a hot expansion side of the compression/expansion unit is in thermal contact with cooling medium of said second cooling circuit.

10. A method for cooling a fuel cell system in a vehicle having a traction unit for propelling the vehicle, a first cooling circuit for circulating a first heat transfer medium through said fuel cell, and a second cooling circuit for circulating a second heat transfer medium at least through said traction unit, said method comprising:

providing a compression/expansion unit connected between said first and second cooling circuits, with a relatively cold expansion side of said compression/expansion unit being in thermal contact with said first heat transfer medium which has been heated by said fuel cell, and a relatively warmer compression side of the compression/expansion unit being in thermal contact with said second heat transfer medium of said second cooling circuit; and transferring heat from said first heat transfer medium to said second heat transfer medium via said compression/expansion unit.

* * * * *